Figure 1:
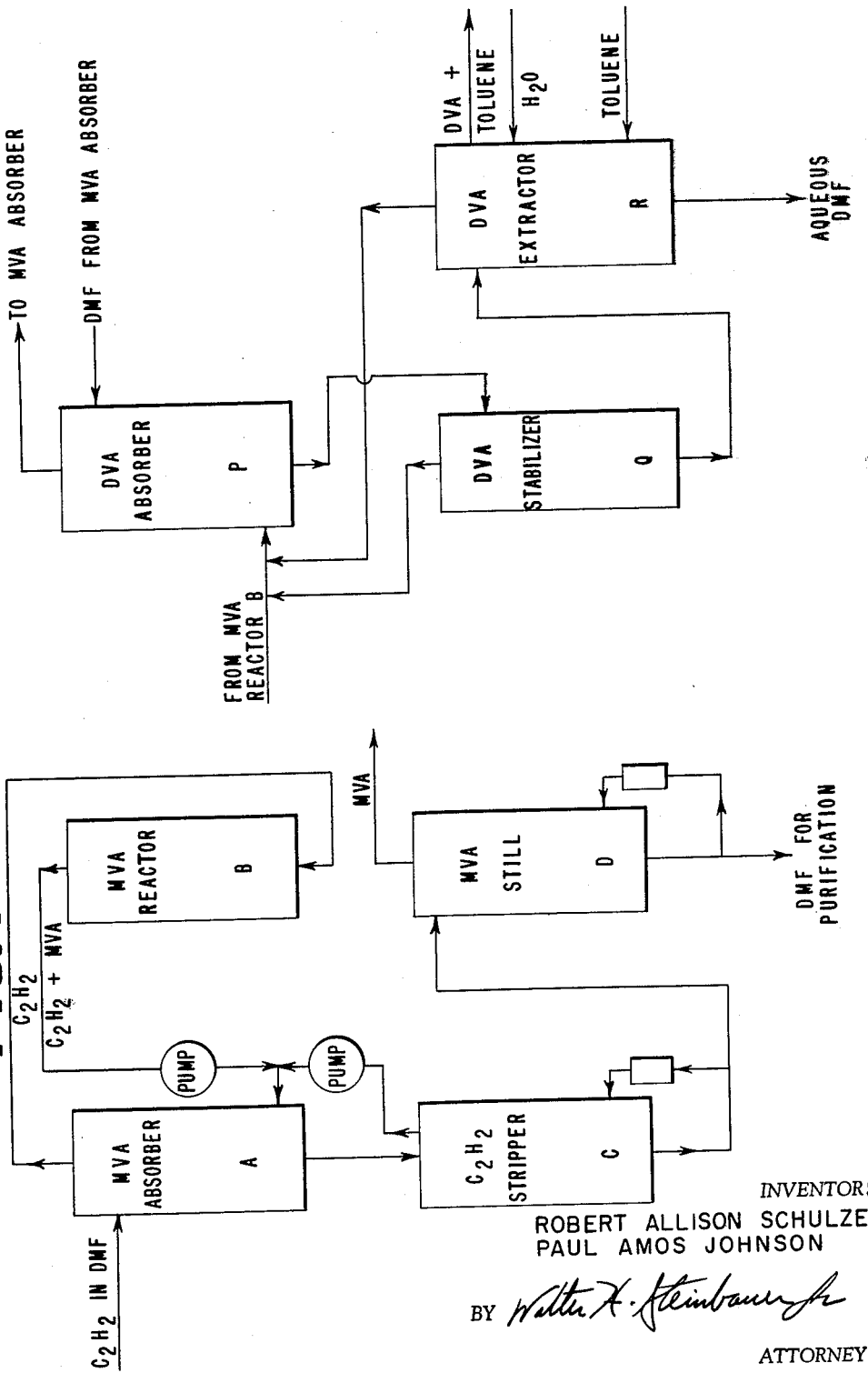

Sept. 1, 1964 P. A. JOHNSON ETAL 3,147,312
INTEGRATED PROCESS FOR MAKING MONOVINYLACETYLENE
FROM DILUTE ACETYLENE GAS
Filed Jan. 9, 1961 2 Sheets-Sheet 1

United States Patent Office 3,147,312
Patented Sept. 1, 1964

3,147,312
INTEGRATED PROCESS FOR MAKING MONO-
VINYLACETYLENE FROM DILUTE ACETY-
LENE GAS
Paul Amos Johnson, New Albany, Ind., and Robert Allison Schulze, Louisville, Ky., assignors to E. I. du Pont de Nemours and Company, Wilmington, Del., a corporation of Delaware
Filed Jan. 9, 1961, Ser. No. 81,370
10 Claims. (Cl. 260—678)

This invention is directed to the manufacture of synthetic elastomers and to making monovinylacetylene, which is an intermediate for chloroprene, which is in turn polymerized to form the elastomers known as the neoprenes. More particularly, this invention relates to an integrated process in which individual processes for the separation of acetylene from mixtures with other gases, the polymerization of acetylene to monovinylacetylene, the isolation of the latter, the recovery and re-use of the auxiliary liquids, and the removal of by-products are integrated to produce significant results not heretofore obtained.

A reduction in the cost of monovinylacetylene is one of the main factors in making a cheaper neoprene available to the industries. An important item in the cost of monovinylacetylene is the acetylene used, usually derived from calcium carbide. Cheaper acetylene may be made by various available processes which subject hydrocarbon gases to direct pyrolysis or to passage through an electric arc. The resulting acetylene is necessarily much diluted with other gases and its separation in the pure form ordinarily required for the conversion to monovinylacetylene is expensive and thus tends to eliminate the cost advantage of acetylene from this source.

It is, therefore, an object of the present invention to provide a novel and advantageous process for making monovinylacetylene from crude dilute acetylene obtained by pyrolysis of hydrocarbons. A further object of this invention is to modify, consolidate, and integrate the existing processes for isolating acetylene and polymerizing it to monovinylacetylene.

These and other objects will become apparent in the following description and claims.

More specifically, the present invention is directed to a continuous process for the manufacture of monovinylacetylene in which process acetylene is separated from a mixture with other gases (obtained by pyrolysis of hydrocarbons) by preferential solution in a water-miscible organic solvent for acetylene and in which the purified acetylene, after removal from the solvent, is passed through a reactor containing a cuprous chloride catalyst whereby it is partly converted to monovinylacetylene which is then separated from the acetylene, the improvement being one of first passing the solution of acetylene in the organic solvent counter-current to the mixture of acetylene and monovinylacetylene from the reactor to yield a gaseous acetylene stream which is recirculated to the reactor, and a solution of monovinylacetylene in the organic solvent, separating the monovinylacetylene from this solution and recovering and recirculating the solvent for the separation of acetylene from the pyrolysis gas.

The heretofore-described process may be modified so that the divinylacetylene formed in minor amount along with the monovinylacetylene and dissolved with it in the water-miscible organic solvent, is allowed to polymerize therein while it is heated during separation of the acetylene and monovinylacetylene, and in which this solution of divinylacetylene polymers in the organic solvent is recirculated to selectively dissolve acetylene from the pyrolysis gas; this modification may be further varied so that at least a portion of the solution of divinylacetylene polymers in the organic solvent is mixed with water to precipitate the polymer, the precipitate is separated, and the solvent is recovered for re-use from its mixture with water; as a further variation, the streams of gases separated from the acetylene may be scrubbed with water to remove the vaporized acetylene solvent which they contain, and the resulting dilute solution of the solvent in water used to precipitate the divinylacetylene polymers.

The process of the present invention may also be modified so that at least part of the divinylacetylene, formed in minor amount along with the monovinylacetylene and dissolved with it in the organic solvent, is prevented from polymerizing and is removed from the solvent by means of a stream of the gas which has been separated from the acetylene, and the stripped solvent is recirculated to selectively dissolve acetylene.

The present novel process may also be varied so that the stream containing acetylene, monovinylacetylene, and divinylacetylene from the reactor is first passed countercurrent to a stream of the organic solvent, giving (1) as overhead a stream of acetylene and monovinylacetylene which is then passed counter-current to the stream of purified acetylene in the organic solvent, and giving (2) as bottom stream a solution of the divinylacetylene monomer, diluting this solution with water to form two phases, separating the resulting divinylacetylene phase, and recovering the solvent by distillation of the other phase.

The drawings are flow diagrams showing the relation of the separate operations utilized in the process of the present invention.

FIGURE 1 shows the fundamental step of the invention, by which a solution of acetylene in a water-miscible organic solvent, specifically dimethylformamide (DMF), is passed counter-current to the mixture of acetylene and monovinylacetylene formed by passing acetylene through a cuprous chloride catalyst. This yields (1) a stream of pure acetylene which is circulated for conversion to monovinylacetylene, and (2) a liquid phase which is separated into pure monovinylacetylene, and solvent, which is further processed and re-used. (See FIGURE 1.)

Figure 2:
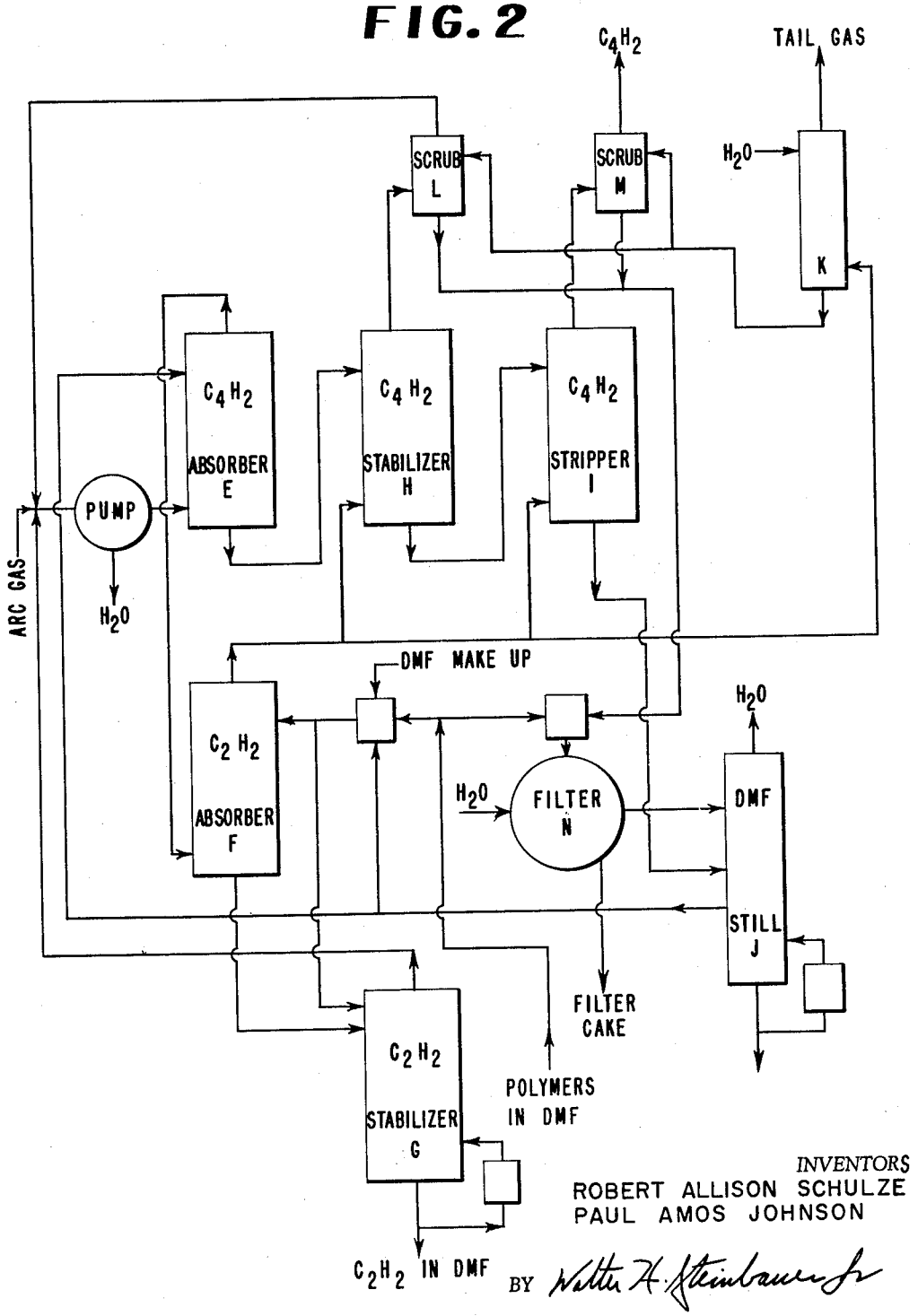

FIGURE 2 shows the purification of the crude acetylene to form a solution of pure acetylene in the water-miscible solvent (exemplified by dimethylformamide, DMF), to be used as in FIGURE 1. The precipitation of divinylacetylene polymer from the water-miscible organic solvent recirculated from the operations shown in FIGURE 1, the purification of this solvent, the recovery of solvent from streams of recirculated and by-product gases, and the utilization of various auxiliary streams. (See Examples 2, 3 and 4.)

FIGURE 3 shows operations which may be performed upon the mixture of acetylene and its polymers flowing from Reactor B to Absorber A of FIGURE 1. Here this gas stream passes counter-current to a relatively small amount of water-miscible solvent which completely dissolves the divinylacetylene and yields a stream of pure acetylene and monovinylacetylene which are then treated as in FIGURES 1 and 2, without the need for subsequent separation of divinylacetylene or its polymers. FIGURE 3 further shows the removal of divinylacetylene monomer and recovery of the solvent. (See Example 6.)

The composition of the gas mixture used as the starting material in the present invention is not critical. It may contain much smaller proportions of acetylene than are present in the arc process gas used in the examples. Thus it may contain only 5% or less of acetylene by volume and large proportions of oxides of carbon, as is the case in general with mixtures obtained by some pyrolysis methods in which part of the hydrocarbon feed is burned in air to furnish the required heat. The gas may also contain methylacetylene, which goes through the purification process with the acetylene and may later be separated from it by distillation or further selective absorption.

Representative acetylene solvent suitable for preferential absorption are found in U.S. Patent 2,838,133. The most convenient acetylene solvents are those which are miscible with water. This property makes it possible to decrease at will the solubility therein of the organic compounds involved in the process by adding water and also to recover the vapor of the solvent from gas streams by simply scrubbing with water. Representative acetylene solvents of this type are acetone, acetonitrile, butyrolactone, dioxane, dimethylformamide, diethylacetamide, and butyrolactam (pyrrolidone). Those boiling above 150° C., particularly dimethyl formamide, are preferred. It is usually advantageous but not necessary, to use the same solvent for separating the acetylene and for carrying out its polymerization to monovinylacetylene.

Solvents of varied but rather limited types may be used in the step of polymerizing acetylene to monovinylacetylene in the presence of cuprous chloride and another chloride which solubilizes the former. See for example, U.S. 1,811,959 and 1,926,039. A valuable class of solvents for this purpose are liquid carboxylic acid amides, specifically those containing not more than six carbon atoms, used with cuprous chloride and a hydrochloride of a primary secondary amine containing not more than six carbon atoms, as described in U.S. 2,875,258. Dimethylformamide, since it is very satisfactory both as a solvent for acetylene purification and as a solvent for the cuprous chloride catalyst, is accordingly especially preferred for the double purpose in the present invention, although other members of the class are also very satisfactory. The performance of these catalysts is improved by having present as a separate phase a hydrocarbon or chlorinated hydrocarbon, as in U.S. 2,934,575, or certain ethers of ethylene glycol and diethylene glycol, as referred to in Example 3. Details of the composition and operation of these catalysts, as given in these patents, are applicable to the present process and are included herein by reference.

It is also entirely possible but much less convenient to use water as solvent for the cuprous chloride catalyst in the present invention. In this case, since water decreases the solvent power of the solvents used later in the process, it is desirable to remove it thoroughly from the stream of acetylene and monovinylacetylene passing from the reactor.

The present invention does not pertain to the form of the equipment used in any of the operations. These separate operations are in general of a type well known in chemical engineering, although applied here to specific materials not so treated before. Selection and design of the equipment, including sizing, materials of construction, and instrumentation, can all be carried out by those skilled in the art. Where equipment of unusual design is advantageous, reference is made in the specification to patents describing the special apparatus. Suitable operating conditions are indicated in the examples but may be greatly varied in accordance with the composition of the mixtures being treated, using well-known principles.

Representative examples illustrating the present invention follow.

*Example 1*

This example illustrates the essential part of the present invention. See FIGURE 1.

A solution of pure acetylene in dimethylformamide, resulting from a purification process described in Example 2, in which process, pyrolysis gas containing acetylene is subjected to a series of absorption and stripping operations, is passed downward through the absorption column A at 40° C. and 55 lbs./sq. in. pressure (p.s.i.g.), counter-current to a stream of gas, introduced near the bottom of the column, consisting essentially of acetylene and monovinylacetylene, produced in the reactor B. Acetylene free from monovinylacetylene leaves the top of the column A and passes to the reactor B, which will be described along with auxiliary equipment in later examples. In this reactor the acetylene is converted to the mixture of acetylene and monovinylacetylene which is introduced into the bottom of column A. Small amounts of other acetylene polymers that are formed at the same time may be handled in various ways, as will be illustrated below.

The bottoms from column A, containing the absorbed monovinylacetylene and some acetylene dissolved in dimethylformamide, pass through a reducing valve to the stripper C, operated at 2 lbs./sq. in. gauge pressure, in which the solution is heated to 105° C., by circulation through a reboiler, giving an overhead containing the acetylene and some monovinylacetylene (which are recirculated to the absorber A after recompression), and a liquid product containing most of the monovinylacetylene and only traces of acetylene dissolved in dimethylformamide. This solution then passes to the still D, operated at a bottom temperature of 155° C. and 1 lb./sq. in. pressure, in which pure monovinylacetylene is separated from the solvent and any high boiling impurities.

The acetylene solution is fed at an hourly rate of 58 parts by weight of acetylene and 695 parts of dimethylformamide to the absorption column A. The gas streams fed to column A are 321 parts by weight of recirculated acetylene and 53 parts of monovinylacetylene from the reactor B, plus 75 parts of recirculated acetylene and 11 parts of recirculated monovinylacetylene from stripper C. Pure monovinylacetylene is produced at a rate of 53 parts per hour from 58 parts of acetylene, the loss being represented by the formation of other polymers of acetylene, as will be discussed in the other examples. The dimethylformamide is recovered essentially without loss from the bottom of still D and is reused. If divinylacetylene has already been removed (see Example 6) this dimethylformamide may be recirculated directly. If it contains divinylacetylene polymer, it may also be recirculated and used (Example 4). If it contains divinyl acetylene monomer, this may be removed as in Example 5.

*Example 2*

This example demonstrates how the dimethyl formamide solution of acetylene in Example 1 is obtained.

The crude acetylene is produced by passing methane through an electric arc and quenching with water. Its composition in parts by weight is as follows:

| | Parts |
|---|---|
| Acetylene | 57.5 |
| Diacetylene | 6.5 |
| Ethylene | 0.3 |
| Carbon monoxide | 2.4 |
| Methane | 6.6 |
| Carbon dioxide | 2.4 |
| Nitrogen | 2.4 |
| Oxygen | 0.3 |
| Hydrogen | 15.6 |
| Water | 7.7 |

This gas (101.7 parts per hour) is fed to the process as shown in FIGURE 2. It is first mixed with minor acetylene-containing streams recirculated from points farther on in the process, as will be described below, and is then compressed to 300 lbs. per sq. in. gauge pressure (p.s.i.g.). The resulting gas stream, from which most of the water vapor has been removed by compression, delivers 62.7 parts of acetylene per hour. This is now fed through the diacetylene absorption tower E at 30° C. and 150 p.s.i.g., counter-current to a stream of dimethylformamide fed at a rate of 112 parts per hour. The dimethylformamide stream from the bottom of this tower contains almost all the diacetylene from the original arc gas and 3.4 parts of acetylene. The unabsorbed gas, containing most of the acetylene, from absorption tower E is compressed to 300 p.s.i.g. and then goes to the bottom of the acetylene absorption column F in which it passes counter-current to 580 parts of dimethylformamide per hour, again at 30° C., the latter absorbing almost all of the acetylene and small amounts of the other gases. These other gases are removed in stabilizer G by heating the acetylene solution to 65°, reducing the pressure to 50 p.s.i.g., and adding 115 parts more of dimethylformamide at the top of the column. The topped gases which contain 0.83 part per hour of acetylene, are recycled through the purification system by adding them to the feed of crude acetylene. The pure acetylene, at the rate of 58 parts per hour, dissolved in dimethylformamide, leaves the bottom of the column and is treated, as described in the other examples.

Returning now to the other streams produced in the present process, the solution containing diacetylene and some acetylene from absorber E pass through a reducing valve to the top of another stripping column H (the diacetylene stabilizer) in which it is treated at 70° C. and 5 p.s.i.g. with a small amount (0.5 part per hour) of the inert gases separated from the acetylene in column F, to remove the acetylene, which is recirculated to the purification system after scrubbing out the dimethylformamide with water. The remaining solution of diacetylene from H is stripped with more of the inert gas (5.3 parts per hour) in stripper I, and the remaining dimethylformamide sent to the still J, for purification.

The unabsorbed inert gas from the acetylene absorber F, consisting mostly of hydrogen, with smaller amounts of methane, ethylene, nitrogen, oxygen, and oxides of carbon, with some dimethylformamide vapor, is partly used for stripping in columns H and I, as already described. The major part is prepared for independent use by scrubbing out the dimethylformamide with water in scrubber K. The dilute aqueous solution from this scrubber is then used to scrub the dimethylformamide from the vapors from H and I in scrubbers L and M, respectively.

*Example 3*

This example shows one method for making monovinylacetylene in connection with the operation of Example 1.

The process of Example 1 is carried out, using as the acetylene reactor B a sieve-plate column, such as is described in U.S. 2,759,985 and operated at 90° C. in which the catalyst solution passes downward through the series of perforated plates and the acetylene passes upward through them and through the catalyst solution and is partly converted to monovinylacetylene (53.3 parts per hour) and small portions of higher polymers, mostly divinylacetylene (3.4 parts per hour) and non-volatile or slightly volatile higher polymers referred to as "tar" (0.21 part per hour).

The catalyst used is a solution containing 53% cuprous chloride, 26% methylamine hydrochloride, and 21% dimethyl formamide by weight, mixed with an equal volume of the mono-2-ethylhexyl ether of ethylene glycol. The 2-ethylhexyl ether is only partly miscible with the salt solution but disperses readily in it and remains dispersed as the mixture is circulated through a pump from the bottom of the column to the top and from there flows downward through the perforated plates and counter-current to the rising gas. The tar accumulates in this catalyst (while the volatile acetylene polymers mono- and divinylacetylene are swept out by the current of acetylene) but is kept from reaching an undesirably high concentration by continually removing a portion of the catalyst, allowing it to separate into two layers, returning the catalyst layer, removing the tar from the hexyl ether layer and recovering the catalyst salts and solvents therefrom.

The reactor is operated at 90° C. and 50–55 p.s.i.g.

*Example 4*

This example illustrates the use of dimethylformamide containing small amounts of divinylacetylene polymers, and the removal of same. See FIGURE 2.

The divinylacetylene with the acetylene and monovinylacetylene passes to the bottom of absorption column A described in Example 1 and accompanies the major part of the monovinylacetylene, dissolved in the dimethylformamide, through the stripper C to the still D, becoming polymerized at the temperatures required for operation of the still D, to non-volatile products which are still soluble in the dimethylformamide. Part of this polymer is allowed to remain in the dimethylformamide which is recirculated for dissolving acetylene in absorber F and stabilizer G as described in Example 2. The concentration of polymers in this recirculated dimethylformamide is kept at a constant low value (5.3%) by constantly withdrawing a portion (73.3 parts per hour) and mixing, at 30° C., with the dilute aqueous dimethylformamide solution used to scrub the gases in K, L, and M (7 parts of water containing 1.2 parts of dimethylformamide). The polymers are thus precipitated in readily filterable form. The filter cake from filter N is washed with 16 parts of water per hour and the filtrate and washings are sent to the still J along with the bottoms from the diacetylene stripper I. Pure dimethylformamide for re-use is returned from J to the diacetylene absorber E, and also, along with some make-up dimethylformamide, to supplement the recirculating stream of dimethylformamide containing polymer fed to F and G.

*Example 5*

This example illustrates the removal of divinylacetylene as monomer from the dimethylformamide solution.

The process of Example 1 is carried out with the acetylene stripper C and the monovinylacetylene still D operated at 80° C., to reduce the polymerization of the divinylacetylene. The bottoms from the monovinylacetylene still D consists essentially of the divinylacetylene dissolved in dimethylformamide. This passes to a stripper in which the divinylacetylene is stripped with the tail gases resulting from the removal of acetylene from the pyrolysis gas as in Example 2. This is the gas stream in FIGURE 2 passing from the acetylene absorber F. The stripped dimethylformamide is returned to the acetylene purification system of FIGURE 2 for use in absorbers E and F. If no substantial amount of divinylacetylene polymer is formed during the circulation of the monomer, the steps of adding water to precipitate the polymer and of recovering anhydrous dimethylformamide shown in Example 4, are unnecessary.

Alternatively, the divinylacetylene monomer may be removed from the bottoms from still D by diluting with water as described in Example 6.

*Example 6*

This example illustrates the removal of the divinylacetylene monomer from the monovinylacetylene before the latter is separated from the acetylene.

The operation is like that of Example 1 and FIGURE 1 but with an absorption column for divinylacetylene treating the product gas passing from reactor B to absorber A, as shown in FIGURE 3.

The gas stream from reactor B (which is operated with a catalyst like that described in Example 3 at 90° C. extended with the 2-ethylhexyl ether of ethylene glycol) combined with minor recycle streams referred to below, contains 720 parts of acetylene, 136 parts of monovinylacetylene and 8 parts of divinylacetylene. This is passed up through the divinylacetylene absorber P, FIGURE 3, at 20° C. and 55 p.s.i.g. counter-current to a stream of 55 parts of dimethylformamide containing small amounts of acetylene and of monovinylacetylene, representing a small part of the bottoms recirculated from the monovinylacetylene absorber A, FIGURE 1. Exchange of material between these streams gives a gaseous stream containing 717 parts of acetylene and 124 parts of monovinylacetylene, and a liquid stream containing all of the divinylacetylene and small amounts of acetylene and of monovinylacetylene in dimethylformamide. The gaseous stream is introduced into absorber A. The liquid stream is heated to 80° in divinylacetylene stabilizer Q with the pressure reduced to 2 lbs./sq. in. to remove most of the residual dissolved acetylene and monovinylacetylene, with some divinylacetylene, all three being recirculated to the divinylacetylene absorber P. The remaining solution of divinylacetylene in dimethylformamide is mixed with 64 parts of water and two parts of toluene in an extraction column R which gives at the top the divinylacetylene dissolved in toluene for safe utilization or disposal, and at the bottom the purified aqueous dimethylformamide, which on distillation gives anhydrous material for re-use. About one part of acetylene is disengaged by this treatment with water and is recirculated to absorber P.

It is understood that the conditions and reactants of the preceding representative examples may be varied within the scope of one skilled in the art; all of such variations are considered to be within the scope of the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A continuous process for manufacturing monovinylacetylene in which process acetylene is separated from a gaseous mixture by preferential solution in a water-miscible organic solvent for said acetylene, and, in which process the purified acetylene is removed from said solvent and passed through a cuprous chloride catalyst, the improvement wherein the solution of acetylene in the water-miscible organic solvent is first passed counter-current to a mixture consisting essentially of acetylene and monovinylacetylene obtained from said cuprous chloride catalyst to yield (1) a gaseous acetylene stream essentially free of monovinylacetylene which stream is recirculated to said cuprous chloride catalyst and (2) a solution of monovinylacetylene in said water-miscible organic solvent, followed by separating the monovinylacetylene and recovering and recirculating said solvent for the separation of acetylene from more of said gaseous mixture.

2. A process as defined in claim 1 where said water-miscible organic solvent is dimethylformamide.

3. A continuous process for manufacturing monovinylacetylene in which process acetylene is separated from a gaseous mixture by preferential solution in a water-miscible organic solvent for said acetylene, and, in which process the purified acetylene is removed from said solvent and passed through a cuprous chloride catalyst, the improvement wherein a mixture consisting essentially of acetylene, monovinylacetylene and a minor amount of divinylacetylene obtained from said cuprous chloride catalyst is passed counter-current to a stream of said water-miscible organic solvent to preferentially remove the divinylacetylene and then passing the remaining gaseous acetylene and monovinylacetylene counter-current to the solution of acetylene in the water-miscible organic solvent to yield (1) a gaseous acetylene stream essentially free of monovinylacetylene which stream is recirculated to said cuprous chloride catalyst and (2) a solution of monovinylacetylene in said water-miscible organic solvent, followed by separating the monovinylacetylene and recovering and recirculating said solvent for the separation of acetylene from more of said gaseous mixture.

4. A process as defined in claim 3 where said divinylacetylene removed in said solvent is mixed with a water-toluene solution and said divinylacetylene is removed in said toluene.

5. A continuous process for manufacturing monovinylacetylene in which process acetylene is separated from a gaseous mixture by preferential solution in a water-miscible organic solvent for said acetylene, and, in which process the purified acetylene is removed from said solvent and passed through a cuprous chloride catalyst, the improvement wherein the solution of acetylene in the water-miscible organic solvent is first passed counter-current to a mixture consisting essentially of acetylene, monovinylacetylene, and minor amount of divinylacetylene obtained from said cuprous chloride catalyst to yield (1) a gaseous acetylene stream essentially free of monovinylacetylene which stream is recirculated to said cuprous chloride catalyst and (2) a solution of monovinylacetylene and divinylacetylene in said water-miscible organic solvent, followed by removing said monovinylacetylene from said solution and then separating said divinylacetylene from said water-miscible solvent and recirculating said water-miscible solvent for the separation of acetylene from more of said gaseous mixture.

6. A process as defined in claim 5 where said divinylacetylene remaining in said solvent after monovinylacetylene separation is mixed with a water-toluene solution and said divinylacetylene is removed in said toluene.

7. A process as defined in claim 5 where said divinylacetylene is polymerized during the separation of said monovinylacetylene from the solution and said polymerized divinylacetylene is removed by addition of water to said solution to precipitate said polymer.

8. A process as defined in claim 3 wherein said water-miscible organic solvent is dimethylformamide.

9. A process as defined in claim 5 wherein said water-miscible organic solvent is dimethylformamide.

10. A process as defined in claim 7 wherein said water-miscible organic solvent is dimethylformamide.

References Cited in the file of this patent

UNITED STATES PATENTS

| | | |
|---|---|---|
| 2,048,838 | Carter et al. | July 28, 1936 |
| 2,146,448 | Scott et al. | Feb. 7, 1939 |
| 2,250,925 | Babcock | July 29, 1941 |
| 2,918,141 | Sennewald et al. | Dec. 22, 1959 |
| 2,993,566 | Griffin | July 25, 1961 |
| 3,093,696 | Sennewald et al. | June 11, 1963 |